（12）United States Patent
Barrett et al.

(10) Patent No.: US 10,005,233 B2
(45) Date of Patent: Jun. 26, 2018

(54) PORTABLE SYSTEM FOR BONDING PIPES

(71) Applicant: WATTS REGULATOR CO., North Andover, MA (US)

(72) Inventors: Stephen R. Barrett, Danvers, MA (US); Steven Castrigno, Manchester, NH (US); Jeffrey A. Scilingo, Londonderry, NH (US)

(73) Assignee: Watts Regulator Co., North Andover, MA (US)

( * ) Notice: Subject to any disclaimer, the term of this patent is extended or adjusted under 35 U.S.C. 154(b) by 0 days. days.

(21) Appl. No.: 15/047,800

(22) Filed: Feb. 19, 2016

(65) Prior Publication Data
US 2016/0167294 A1 Jun. 16, 2016

Related U.S. Application Data

(62) Division of application No. 13/874,589, filed on May 1, 2013, now Pat. No. 9,296,153.

(51) Int. Cl.
*B29C 65/36* (2006.01)
*B29C 65/00* (2006.01)
(Continued)

(52) U.S. Cl.
CPC ........ *B29C 66/73921* (2013.01); *B29C 65/02* (2013.01); *B29C 65/368* (2013.01);
(Continued)

(58) Field of Classification Search
CPC ............ B29C 65/3652; B29C 66/1222; B29C 66/1224; B29C 66/5221; B29C 66/534;
(Continued)

(56) References Cited

U.S. PATENT DOCUMENTS 5,412,184 A * 5/1995 McGaffigan ........ B29C 65/3668
219/635
5,462,314 A * 10/1995 Goto ................... B29C 65/3612
285/21.2
(Continued)

FOREIGN PATENT DOCUMENTS

CA 1260663 A 9/1989
JP 2002295778 A * 10/2002 ......... B29C 65/3432

OTHER PUBLICATIONS

Translation of JP 2002-295778 A, Oct. 2002, Tokiyoshi, Kazuo.*
(Continued)

*Primary Examiner* — George Koch
(74) *Attorney, Agent, or Firm* — Burns & Levinson LLP; George N. Chaclas

(57) ABSTRACT

A kit for fusing piping includes a plurality of couplings, each coupling having a susceptor layer concentric with a weld zone. A control unit provides a current to a wand with a handle for gripping by a user. The handle has opposing jaws mounted on the distal end, each jaw including an arcuate conductor such that the arcuate conductors form a circular inner diameter when the jaws make contact. A lever system couples to the distal end for opening and closing the jaws. The lever system includes a spring for selectively biasing the lever system in a latched position with jaws closed and an open position with the jaws open. Each coupling is sized such that the jaws will only close about the weld zone. The arcuate conductors create a fuse zone about the susceptor layer and the spring is outside the fuse zone.

28 Claims, 13 Drawing Sheets

(51) Int. Cl.
*F16L 47/03* (2006.01)
*B29C 65/02* (2006.01)
*B29C 65/56* (2006.01)

(52) U.S. Cl.
CPC ...... *B29C 65/3652* (2013.01); *B29C 65/3668* (2013.01); *B29C 65/3676* (2013.01); *B29C 66/1222* (2013.01); *B29C 66/1224* (2013.01); *B29C 66/5221* (2013.01); *B29C 66/52231* (2013.01); *B29C 66/52241* (2013.01); *B29C 66/52292* (2013.01); *B29C 66/534* (2013.01); *B29C 66/5344* (2013.01); *B29C 66/841* (2013.01); *B29C 66/861* (2013.01); *B29C 66/8614* (2013.01); *B29C 66/8748* (2013.01); *B29C 66/91921* (2013.01); *B29C 66/9441* (2013.01); *B29C 66/97* (2013.01); *F16L 47/03* (2013.01); *B29C 65/364* (2013.01); *B29C 65/3612* (2013.01); *B29C 65/562* (2013.01); *B29C 66/71* (2013.01); *B29C 66/8324* (2013.01); *B29C 66/919* (2013.01); *B29C 66/949* (2013.01); *B29C 66/9672* (2013.01)

(58) Field of Classification Search
CPC ................ B29C 66/5344; B29C 66/71; B29C 66/73921; B29C 66/841; B29C 66/861; B29C 66/8614; B29C 66/8748; B29C 66/97; B29C 66/52241; F16L 47/03

USPC .................................. 156/359, 367, 368, 579
See application file for complete search history.

(56) References Cited

U.S. PATENT DOCUMENTS

| | | | | |
|---|---|---|---|---|
| 5,484,506 | A | * | 1/1996 | DuPont .................. B29C 65/18 156/158 |
| 5,919,335 | A | * | 7/1999 | Ralls ...................... B23B 5/167 156/158 |
| 6,045,640 | A | | 4/2000 | Wermelinger |
| 7,984,738 | B2 | | 7/2011 | LaMarca et al. |
| 2006/0197338 | A1 | | 9/2006 | Ziu et al. |
| 2009/0314770 | A1 | | 12/2009 | LaMarca et al. |
| 2010/0072742 | A1 | * | 3/2010 | LaMarca ............. B29C 65/3668 285/21.2 |

OTHER PUBLICATIONS

D.P. LaMarca et al., "Advancements in Plastic Pipe System Technology", 2010 IAPMO/ WPC Emerging Technology Symposium—May 11-12, 2010.

* cited by examiner

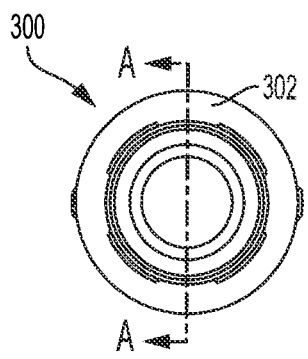
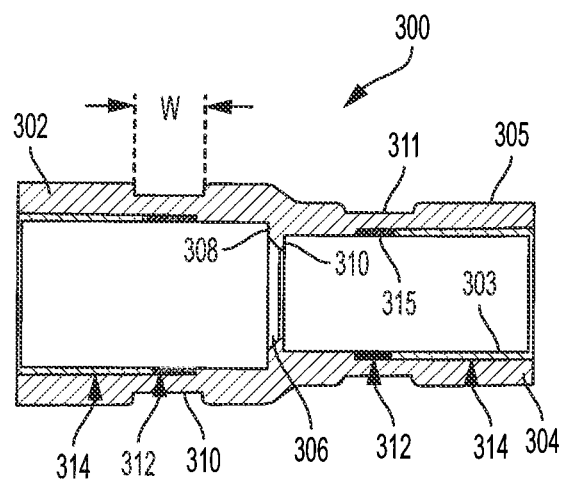
FIG. 13A
FIG. 13B
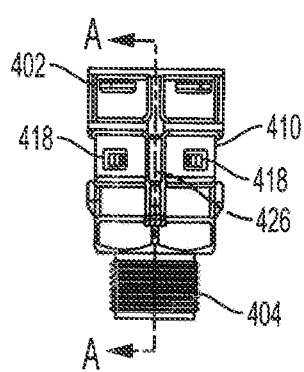
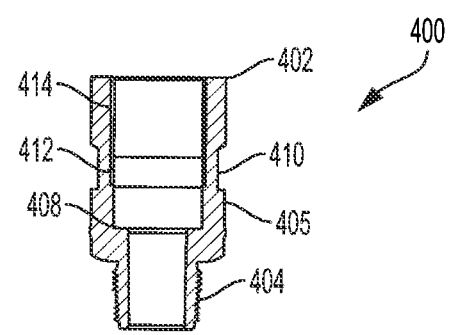
FIG. 14A
FIG. 14B

PORTABLE SYSTEM FOR BONDING PIPES

CROSS REFERENCE TO RELATED APPLICATION

This application is a divisional of and claims priority from earlier filed U.S. non-provisional patent application Ser. No. 13/874,589, filed May 1, 2013, now U.S. Pat. No. 9,296,153 B1, which is incorporated herein by reference.

BACKGROUND OF THE DISCLOSURE

1. Field of the Disclosure

The subject disclosure relates to systems and methods for creating pipe networks in the field, and more particularly to an improved system and method for joining thermo-plastic pipes quickly, efficiently and effectively.

2. Background of the Related Art

Historically, copper piping was the dominant type of system used in potable residential systems in new construction. In the last 40 years, the number of plastic pipe installations has been steadily increasing to above 80% of the systems. However, plastic pipe systems do present challenges. Often, the plastic is resistant to solvents so that joining by cementing is not effective. Thus, typical connections are mechanical or some form of heat fusion. Electro-fusion is a popular type of heat fusion as shown by U.S. PG Publication Nos.: 2006/0197338 A1; 2009/0314770 A1; and 2010/0072742 as well as U.S. Pat. Nos. 3,378,672; 3,465,126; 3,506,519; 6,450,544; 6,250,686; and 7,984,738.

While the electro-fusion method has appeal, it has not been without its problems as there are many subtleties that can result in problems in joining plastic pipes such as polypropylene and polyvinylidene fluoride by electro-fusion. Additionally, subtleties in joint design, coupled with inadequate joining, can lead to failures occurring in service after prolonged periods of time. For this reason, many projects have suffered through severe installation difficulties, while others have seen after installation failures occur due to mechanical and other breakdowns.

Generally, contractors tend to prefer the labor savings and ease of joining offered by mechanical joining methods, whereas engineers and code officials tend to prefer the use of fused joints. Matters are often further complication by areas that are inaccessible, such as behind walls and in underground locations. Engineers tend to view fused joints as having less likelihood of leaks over time. Conversely, engineers and code officials tend to view mechanical methods as having a distinct possibility of loosening over time, whereby leaks could occur. As a result, mechanical joints are disfavored and limited to instances where there is access to repair the joints, if needed.

In prior art electro-fusion methods, the methods involve applying heat and compression to the joints, requiring long set up time with external clamps. Further, the clamping force required is difficult to quantify so variability in effectiveness of the joints often occurs since there are many human elements involved in the joining processes. With less than satisfactory results, a high rate of leaks and generally poor performance are encountered. As would be appreciated, as the size of the project increases, the additional labor required for clamping and attending to the fusion process can become undesirable.

Another disadvantage in prior art electro-fusion systems is that such systems require specialized configuration of the piping. The additional time, tools and skill required to create such items as a threaded pipe end creates further expense, delay, difficulty and opportunity for human error to be introduced.

SUMMARY OF THE INVENTION

In view of the above, there is a need for improved systems and methods for joining pipes in outdoor, indoor, hot and cold application. The technology is preferably provided as a kit, which contains a portable device for fusing and the necessary couplings to work with the portable device. The portable device and couplings can be quickly and easily used to create reliable, consistent, high quality pipe joints by technicians with minimal training. The subject technology has universal application including installations of geothermal systems, irrigation systems, natural gas systems, potable systems of less than or equal to three inches in diameter, and potable systems of greater than or equal to three inches in diameter.

In one embodiment, the subject technology is directed to a portable device for fusing thermoplastic piping using a fitting having a susceptor layer. The portable device includes a control unit for providing a current at high frequency and a wand connected to the control unit. The wand includes a handle for gripping by a user, the handle having a proximal end connected to the control unit and a distal end. A lever system couples to the distal end and includes: a bracket; a pivot arm rotatably mounted on the bracket on a first end and having a roller on a second end; a lever containing a spring cage, the lever being rotatably mounted on a second end of the bracket and contacting the roller; and a spring mounted in the spring cage. A fixed jaw mounts on the distal end. The fixed arm includes a first arcuate conductor. A pivot jaw rotatably couples to the distal end for selectively contacting the fixed jaw. The pivot jaw also includes a second arcuate conductor such that the arcuate conductors form a circular inner diameter when the jaws make contact.

The spring: i) biases the lever away from the handle by applying a force to the roller and, in turn, biases the pivot jaw open away from the fixed jaw; ii) upon application of a force by the user to the lever to overcome the spring and rotate the lever towards the handle, the spring applies a preload force to the pivot jaw to allow the lever system to operate smoothly while the user applies additional force to bring the jaws into contact to form the circular inner diameter; and iii) in a latched closed position with the jaws closed and the lever adjacent and/or parallel the handle, the spring applies a preload force and a bias to the lever system so the lever system remains latched when the user removes the force against the lever. The portable device also includes circuitry in the handle and control unit for determining when the jaws are latched about the fitting and providing the current to the arcuate conductors and, in turn, creates a magnetic field in the fitting such that a pipe therein is fused to the fitting.

The portable device may also include a switch in the wand that is activated when the jaws close with at least one of the jaws. The switch may be magnetic, mechanical and the like. The portable device also has calibration circuitry for adjusting a predetermined time for fusing based upon ambient temperature, wherein the calibration circuitry is activated by a button on the wand. The control unit defines a storage area having a plurality of fittings, wherein each fitting defines a weld zone configured to match an inner circumference of the closed jaws and each fitting includes ridges outside the weld zone to prevent the jaws from being closed thereon. The control unit also has shoulders defining channels and further comprising at least one cable extending between the control unit and the wand, the at least one cable being wrapped around one at least one of the shoulders in the respective channel.

The handle also may include an air wound inductor coil that creates an oblong fuse zone with the arcuate conductors, the spring being outside of the fuse zone. In one embodiment, the pivot jaw has a camming protrusion that pushes against a slidably movable bar in the handle so that when the pivot jaw closes, the movable bar closes a horizontal switch to indicate closing of the jaws and, thereby, activation of fusing is prevented when the jaws are open. Preferably, once a fusing operation starts, the wand senses an electromagnetic load of the susceptor layer within the jaws and if the electromagnetic load is wrong, the fusing operation is stopped. An ambient temperature sensor is in the control unit for determining ambient temperature and automatically adjusting fusing times based on the ambient temperature and a size of the fitting to be fused.

In another embodiment the subject technology is directed to a kit for fusing thermoplastic piping including a plurality of couplings, each coupling having a susceptor layer concentric with a weld zone, a control unit for providing a current at high frequency, and a wand connected to the control unit. The wand has a handle for gripping by a user, the handle having a proximal end connected to the control unit and a distal end, and opposing jaws mounted on the distal end, each jaw including an arcuate conductor such that the arcuate conductors form a circular inner diameter when the jaws make contact.

A lever system couples to the distal end for opening and closing the jaws. The lever system includes a spring for selectively biasing the lever system in a latched position with jaws closed and an open position with the jaws open. Each coupling is sized such that the jaws will only close about the weld zone. The arcuate conductors create a fuse zone about the susceptor layer and the spring is outside the fuse zone.

The wand may sense an electromagnetic load of the susceptor layer within the jaws. The wand, fitting and pipe are all snugly assembled so that during fusing, the position of the fuse zone is predetermined. In one embodiment, a width and diameter of the weld zone matches the jaws so that a position of the fuse zone about the fitting and pipe therein is substantially predetermined when the jaws close thereabout. Preferably, an outer diameter of the coupling is relatively reduced in the weld zone. Further, each coupling forms a shoulder spaced apart from the weld zone so that when a pipe end is inserted into the coupling until contact is made with the respective shoulder by the pipe, the pipe is positioned correctly with respect to the weld zone for fusing. Each coupling may include a retainer area portion having a thin sleeve that encloses the susceptor rings. Each coupling preferably forms at least one indentation in the weld zone so that upon completion of fusing, the indentation moves outward to provide a visual and tactile indication of complete fusing. The indentation includes a secondary radially inward central depression. The susceptor ring is preferably a dual concentric susceptor ring.

It should be appreciated that the present technology can be implemented and utilized in numerous ways, including without limitation as a process, an apparatus, a system, a device, a method for applications now known and later developed or a computer readable medium. These and other unique features of the technology disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

FIG. 13A is an end view of a straight coupling in accordance with the subject disclosure.

FIG. 13B is a side cross-sectional view of the coupling of FIG. 13A taken along line A-A of FIG. 13A.

FIG. 14A is an end view of a straight coupling in accordance with the subject disclosure.

FIG. 14B is a side cross-sectional view of the coupling of FIG. 14A taken along line A-A of FIG. 14A.

DETAILED DESCRIPTION OF PREFERRED EMBODIMENTS

Figure 1:
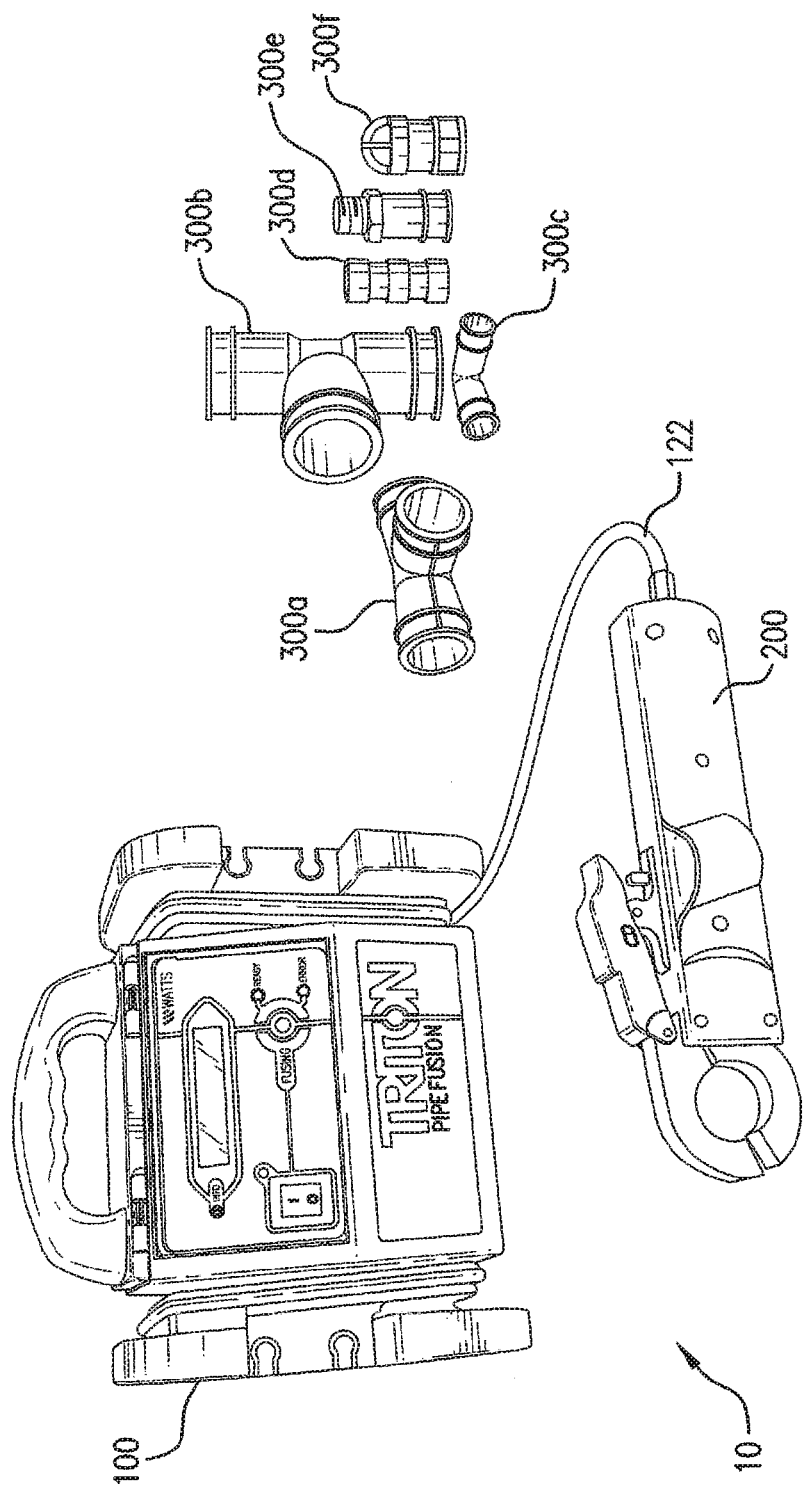
FIG. 1 is a perspective view of a kit for fusing pipes in accordance with the subject disclosure.
Figure 2:
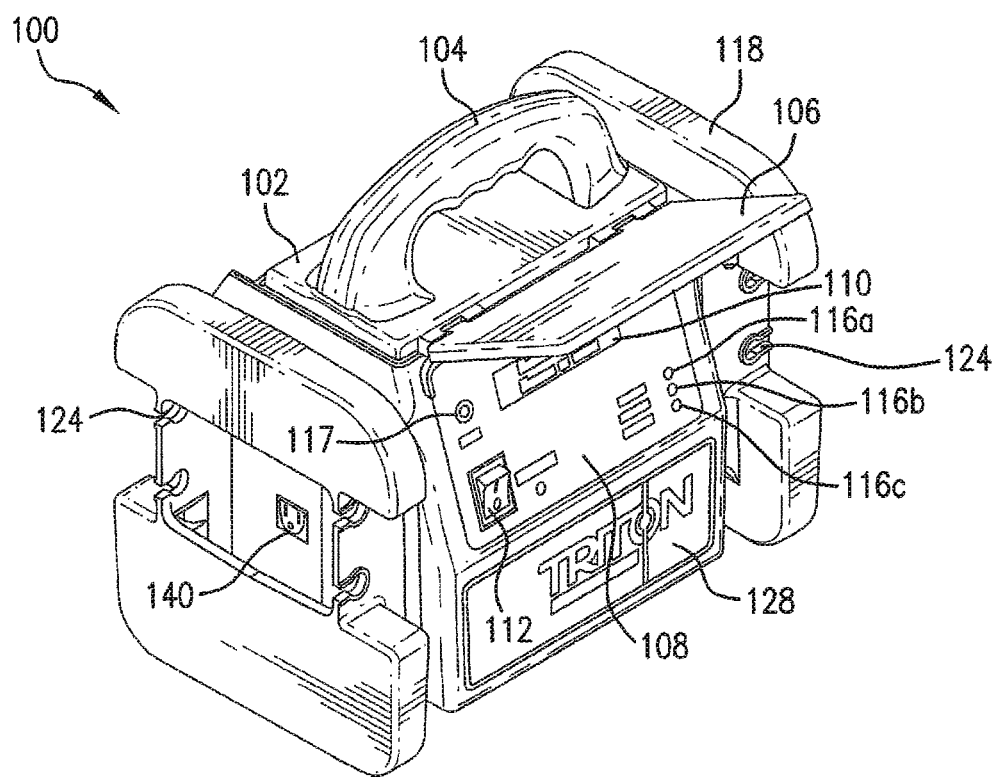
FIG. 2 is a front perspective view of a control unit for the kit of FIG. 1 in accordance with the subject disclosure.
Figure 3:
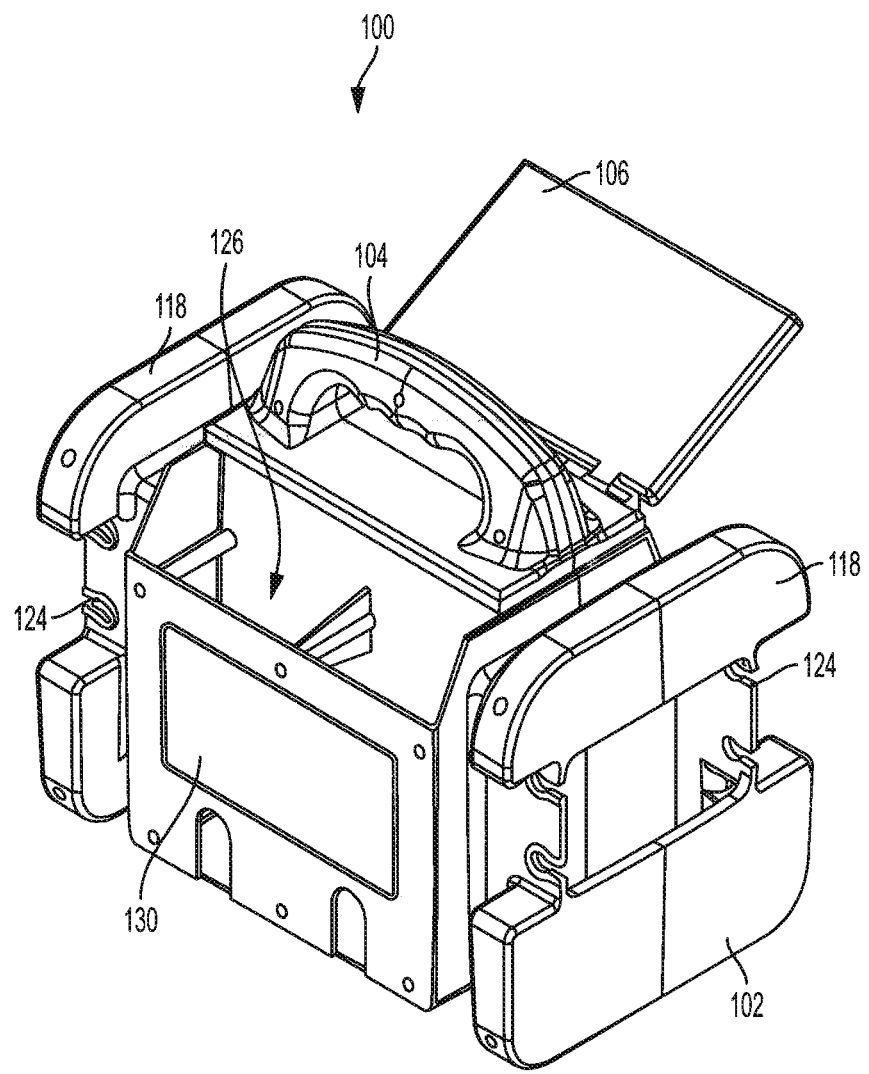
FIG. 3 is a rear perspective view of the control unit of FIG. 2.
Figure 4:
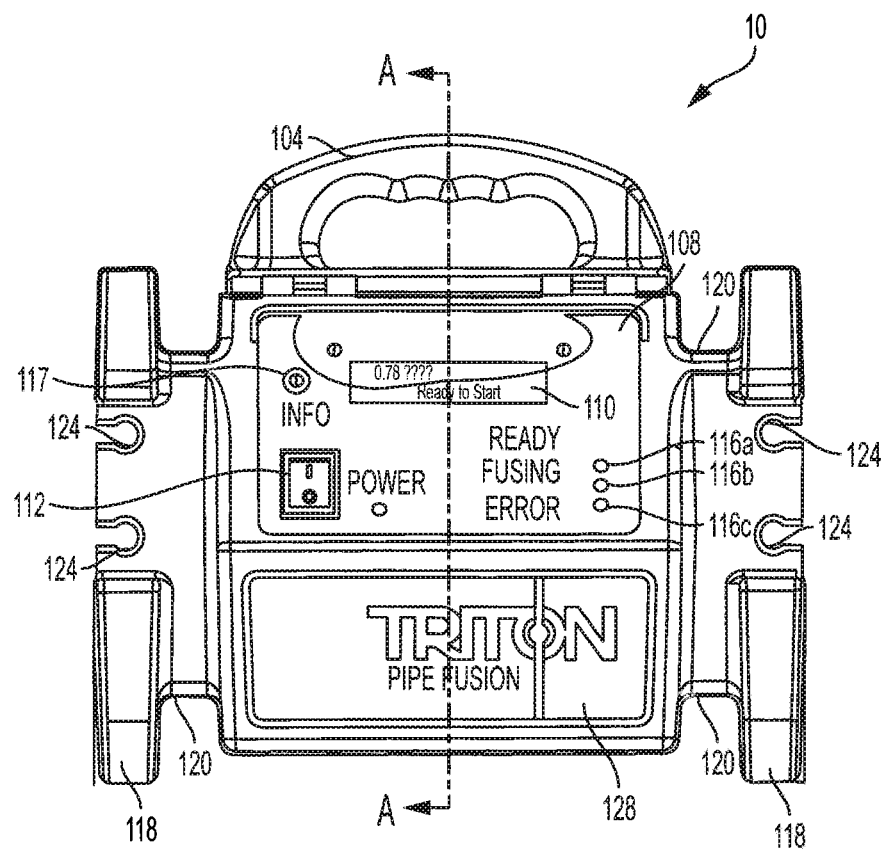
FIG. 4 is a front view of the control unit of FIG. 2.
Figure 5:
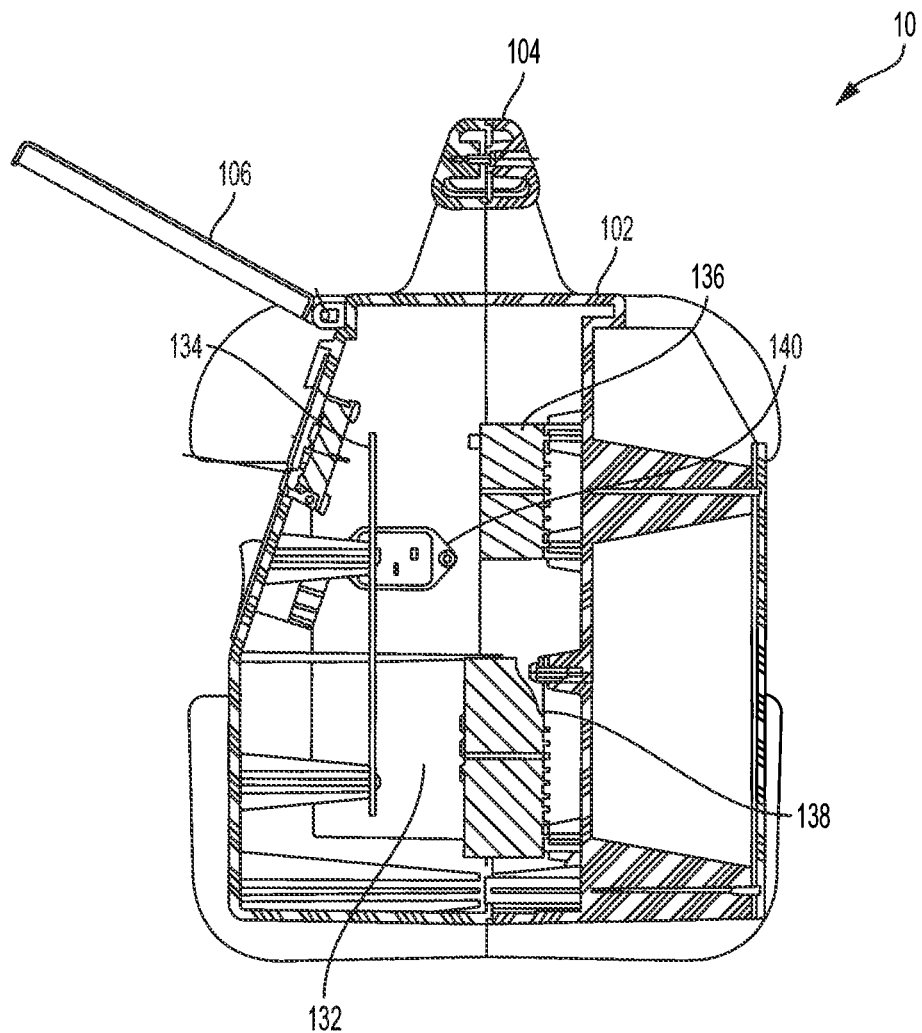
FIG. 5 is a cross-sectional view of the control unit of FIG. 2 taken along line A-A of FIG. 4.

The present disclosure overcomes many of the prior art problems associated with electro-fusion of plastic pipes. The advantages, and other features of the systems, methods and kits disclosed herein, will become more readily apparent to those having ordinary skill in the art from the following detailed description of certain preferred embodiments taken in conjunction with the drawings which set forth representative embodiments of the present invention and wherein like reference numerals identify similar structural elements. All relative descriptions herein such as left, right, up, down, horizontal, and vertical are with reference to the Figures, and not meant in a limiting sense. The illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology.

Referring now to FIG. 1, a perspective view of a kit 10 for fusing pipes in accordance with the subject disclosure is shown. The kit 10 includes a portable device or control unit 100 for powering a fusion wand 200. The kit 10 also includes a plurality of couplings 300 for various size pipe configurations. Typically, the kit 10 includes several differently sized wands (not shown) as required to accommodate the different size and shape couplings 300. In brief overview, the kit 10 allows easily joining one or more pipe ends (not shown) using one of the variously sized and shaped couplings 300. For example, couplings 300a-f are shown. Couplings 300a, 300b are T-shaped for joining three pipe ends. Coupling 300c is elbow or L-shaped for joining two pipe ends. Coupling 300d is straight with a threaded end to engage a fixture on one side and be electro-fused to a pipe end on the other side. Coupling 300f is an end plug to join to a pipe end and, thereby, terminate the flowpath. An endless variation of size and shape couplings 300 can be provided for selection by the technician for particular purposes. As described below, a pipe end is inserted into a coupling 300, then the wand 200 applies a radio frequency (RF) signal to fuse the pipe end to the coupling 300.

Control Unit

Referring now to FIGS. 2-5 a front perspective view, a rear perspective view, a front view and a cross-sectional view of the control unit 100 for the kit 10 are shown. The control unit 100 has a rugged main body 102 with a handle 104 for easy carrying. A cover 106 is hingedly connected to the main body 102 to selectively protect a control area 108 including an informational LCD screen 110, a power switch 112 with corresponding power indicator 114, and three indicator lamps 116a-c. The cover 106 is preferably clear. The indicator lamps 116a-c indicate "ready" for fusing, "fusing", and "error" in fusing, respectively. Another button 117 in the control area 108, designated "info," allows scrolling through various information readings on the LCD screen 110.

The control unit 100 has shoulders 118 so that channels 120 are formed in which cables may be efficiently wrapped. For example, the cable 122 between the control unit 100 and wand 200 may be disconnected from one or both of the control unit 100 and wand 200 for wrapping about a channel 120. The ends of the cable 122 may be captured in keyholes 124 formed adjacent the channels 120. The wand 200 may also remain attached to the cable 122 after wrapping and be placed in a storage area 126 formed in the back of the control unit 200. Additional couplings or different size wands may also be stored in the storage area 126 so that the technician may easily carry a complete kit 10 for fusing pipes to the work location. A typical second cable (not shown) would be the power cord, which may be quite long for outdoor applications and connect to a socket 140.

The outside of the control unit 100 also include a front branding area 128 where a trademark and other company or kit information may be located. The back of the control unit 100 also includes another information area 130 that may provide operational instructions, a model number, and a service and/or assistance telephone number and the like.

The control unit 100 also defines an interior 132 that houses a printed circuit board 134 to control operation. The interior 132 also includes a 40 Watt, 12 Volt power supply 136 and a 150 Watt, 48 Volt power supply 138. Although not explicitly shown, the interior 132 also includes the necessary components for the informational LCD screen 110, power switch 112, power indicator 114, and indicator lamps 116a-d as would be appreciated by those of ordinary skill in the art.

The control unit 100 receives conventional 120 Volt AC power but converts the AC power to a high frequency current for deliver to the wand 200 via the cable 122. In one embodiment, the frequency of the current is 13.56 MHz with a power draw of about 100-150 Watts to complete a fusing operation.

Figure 6:
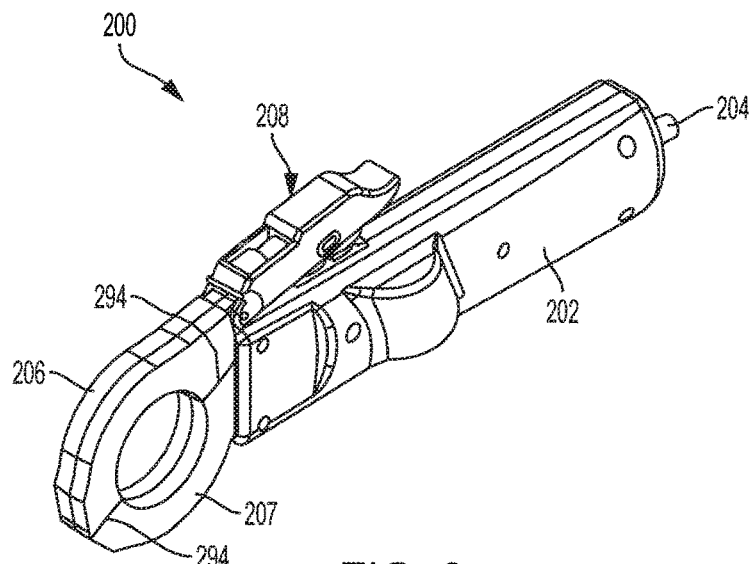
FIG. 6 is a perspective view of a wand for the kit of FIG. 1 in accordance with the subject disclosure.
Figure 9:
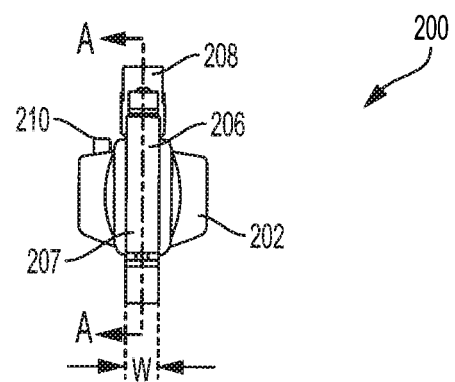
FIG. 9 is an end view of the wand of FIG. 6.
Figure 10:
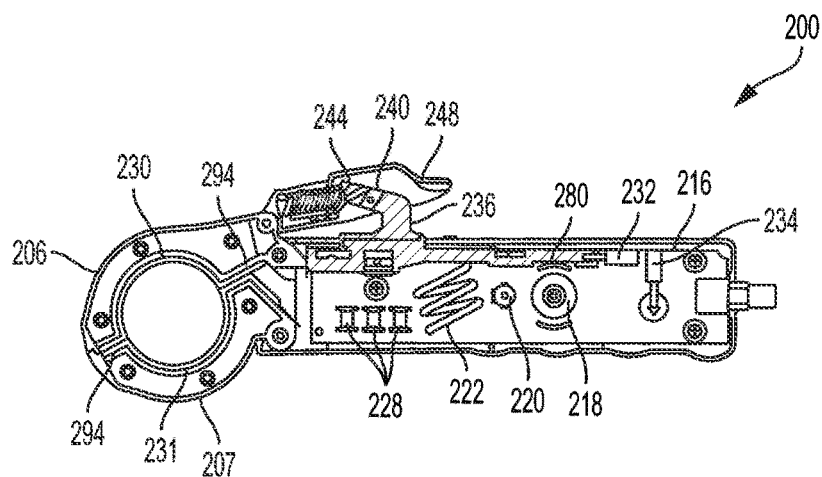
FIG. 10 is a side cross-sectional view of the wand of FIG. 6 taken along line A-A of FIG. 9.

Referring now to FIG. 6, a perspective view of the wand 200 for the kit 10 of FIG. 1 is shown. The wand 200 has a grip housing 202 sized and configured to be held with a single hand during operation although many technicians may use both hands. The grip housing 202 has a proximal end connector 204 for receiving the RF signal from the control unit 100 via the ohms cable 122. The wand 200 also has opposing distal end jaws 206, 207 that selectively open and close to encircle a coupling. When closed, the jaws 206, 207 perform the electro-fusion of the coupling to a pipe. A lever system 208 controls the opening and closing operation of the movable jaw 206, whereas the other jaw 207 is fixed with respect to the grip housing 202. As best seen in FIG. 9, an actuation button 210 determines when the electro-fusion operation occurs. During electro-fusion, an LED 212, also best seen in FIG. 9, illuminates to let the technician visually recognize that fusion is ongoing.

Wand

Referring now to FIGS. 7-12, an exploded perspective view and several other views, including cross-sectional views, of the wand 200 are shown. The grip housing 202 has first and second portions 214a, 214b that mate to surround inner components. Fasteners or a snap fit mechanism (not shown) may hold the portions 214a, 214b together. As would be appreciated by those of ordinary skill in the pertinent art, the inner components are represented somewhat schematically and the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., wires, fasteners, connectors and the like) are absent in the illustration for simplification and clarity.

In a preferred embodiment, the connector 204 is a BNC connector that couples to a PCB assembly 216. The PCB assembly 216 includes a balun 218 and adjustable capacitor 220 as well as an air wound inductor coil 222. It is noted that the grip housing 202 is contoured to accommodate the inductor coil 222. The PCB assembly 216 also include three micro-capacitors 228. The PCB assembly 216 ultimately connects to a two-part work coil or copper ring 230, 231 retained concentrically in the jaws 206, 207, respectively. The PCB assembly 216 functions to selectively provide power to the work coil 230, 231 and, as such, along with the control unit 100 includes circuitry to accomplish operation as described herein.

Figure 11:
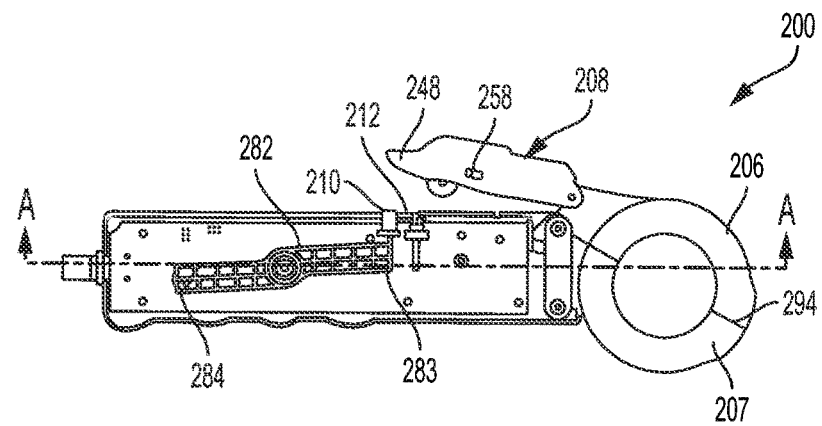
FIG. 11 is another side cross-sectional view of the wand of FIG. 6 looking from the opposite perspective as that of FIG. 8.
Figure 12:
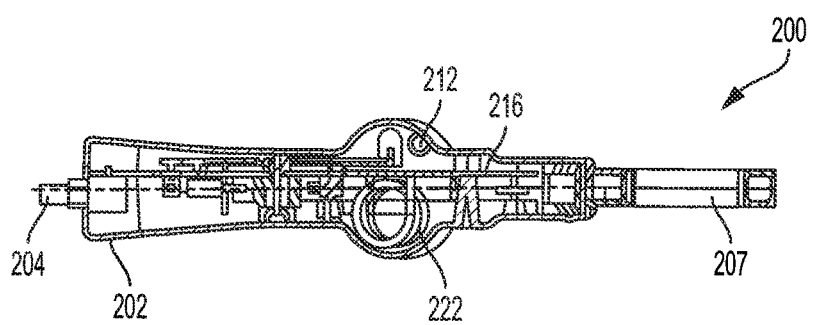
FIG. 12 is a top cross-sectional view of the wand of FIG. 6 taken along line A-A of FIG. 11.

The lever system 208 and the actuation button 210 also interact with the PCB assembly 216. The PCB assembly 216 includes a horizontal switch 232 that is closed when the jaws 206, 207 are closed as described in more detail below. The PCB assembly 216 also includes a vertical switch 234 that is closed when the actuation button 210 is depressed. As best seen in FIG. 11, a leg 282 extends from the actuation button 210 to the vertical switch 234. The leg 284 is centrally rotatably coupled to the grip housing 202 so that upon the button 210 moving a first end 283 downward, a second end 284 of the leg moves upward to close the vertical switch 234.

Still referring to FIGS. 7-12, the lever system 208 includes a bracket 236 upstanding from the grip housing 202. A first pin 238 mounts a bottom end hole 237 of a pivot arm 240 to the bracket 236. A second pin 242 couples a bushing or a roller 244 to a top end hole 246 of the pivot arm 240. A third pin 249 also centrally couples the pivot arm 240 to a trigger lever 248 through an intermediate slot 258 formed in the trigger lever 248. Also, the third pin 249 couples into an intermediate hole 251 of the pivot arm 240 for facilitating latching and unlatching of the jaws 206, 207.

A proximal end 250 of the trigger lever 248 is depressed by the technician to close the jaws 206, 207 about a coupling as described below. A distal end 252 of the trigger lever 248 is rotatably connected to a proximal end 254 of the movable jaw 206 by a fourth pin 256. The trigger lever 248 encloses a spring cage 260 extending to the roller 244. The spring cage 260 is largely tubular with a proximal flange 262. A coiled spring 264 mounts in the spring cage 260 to provide resistive force as described below with respect to the operation of the wand 200.

Figure 7:
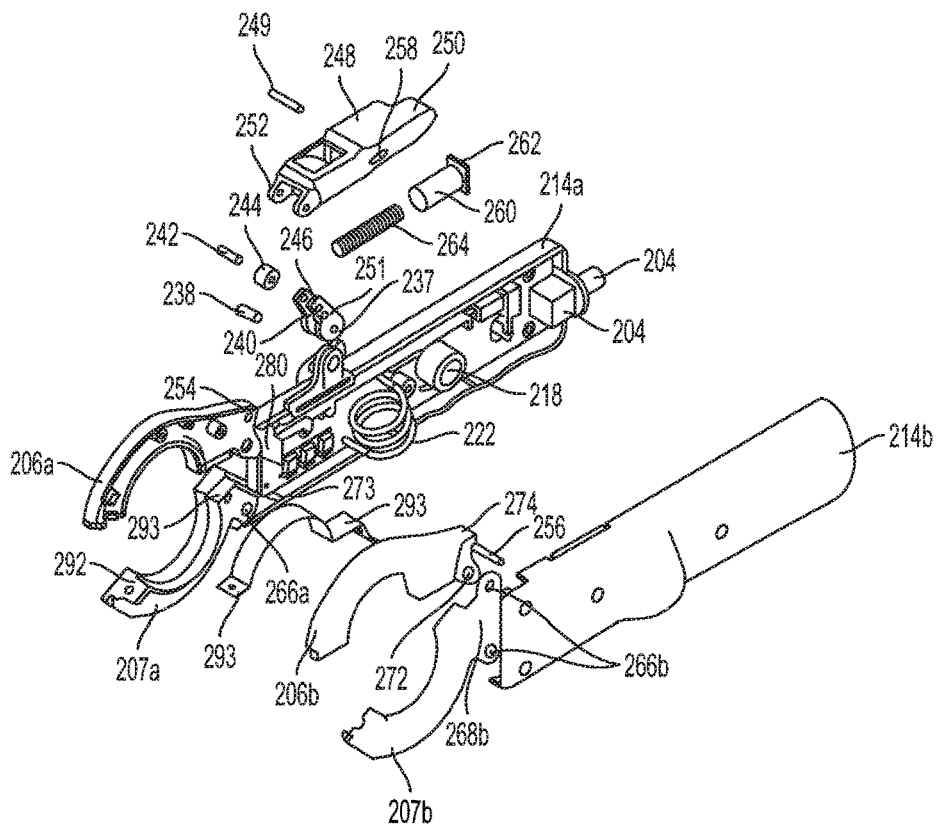
FIG. 7 is an exploded perspective view of the wand of FIG. 6 in accordance with the subject disclosure.
Figure 8:
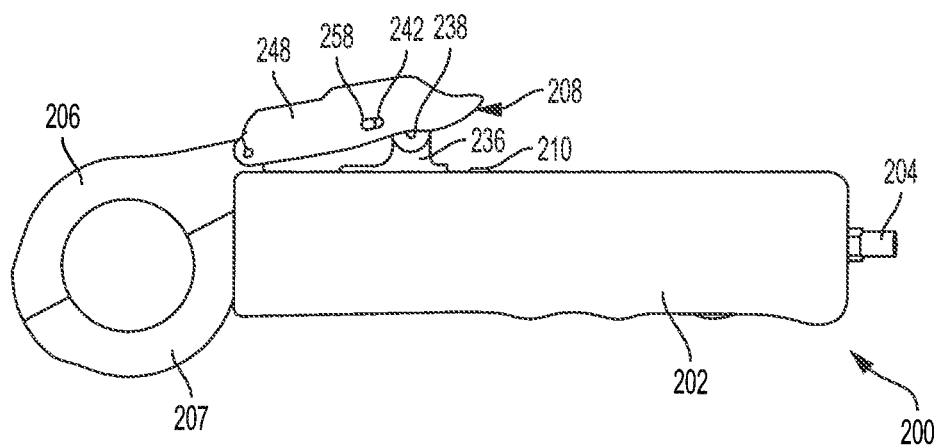
FIG. 8 is a side view of the wand of FIG. 6.

As best seen in FIG. 7, each jaw 206, 207 has two parts or halves 206a-b, 207a-b, respectively, which may be snap fit, cemented, screwed or otherwise fixed together when assembled. The fixed jaw 207 mounts distally on the grip housing 202 by two fasteners (not shown) that pass through holes 266b in a mounting flange portion 268b of the jaw half 207b. The jaw half 207a also forms a hole 266a in a mounting flange portion 268a so that when the halves 207a, 207b are joined, the jaw 207 does not move with respect to the grip housing 202.

In contrast, the other jaw 206 is rotatably coupled to grip housing 202 to oppose and selectively contact the fixed jaw 207. The rotating jaw 206 is more symmetrical than the fixed jaw 207. The rotating jaw 206 also has a mounting flange portion 270 forming two holes 272, 274. The lower hole 272 is coupled to the grip housing 202 and fixed jaw 207 by, for example, a boss 273 formed on the grip housing 202. As noted above, the upper hole 274 on the proximal end 254 of the movable jaw 206a is coupled to the distal end 252 of the trigger lever 248 by the fourth pin 256.

The rotating jaw 206 also forms a camming protrusion 278 that pushes against a movable bar 280. The movable bar 280 is slidably mounted to the grip housing 202 so that when the jaws 206, 207 close, the movable bar 280 closes the horizontal switch 232. As a result, the horizontal switch 232 provides an indication of when the jaws 206, 207 are closed to the PCB assembly 216. Thus, the logic of the control unit 100 and/or wand 200 can prevent activation of fusing when the jaws 206, 207 are open.

Still referring to FIGS. 7-12, each jaw 206, 207 houses the arcuate conductors 230, 231 such as an arcuate copper band, respectively. Each respective end 292, 293 of the arcuate conductors 230, 231 forms a radial extension that is exposed. When the jaws 206, 207 are closed, the ends 292, 293 meet at contact points 294 so that the arcuate conductors 230, 231 form a circle, which acts as a work coil during the fusing operation.

Referring now in particular to FIG. 9, the jaws 206, 207 have a width "W" slightly larger than a width of the conductors 230, 231. The width "W" is chosen to match the configuration of the couplings to be fused by the wand 200. Thus, in a single kit, one control unit 100 may be paired with a plurality of different size wands 200 and the associated varying size conductors 230, 231 to match varying pipe diameters and coupling configurations.

Fusing Couplings

Referring now to FIGS. 13A and 13B, an end view and a side cross-sectional view of a straight tubular coupling 300 in accordance with the subject disclosure are shown. The coupling 300 has a relatively larger end 302 for fusing to a relatively larger pipe end (not shown) and a relatively smaller end 304 for fusing to a relatively smaller pipe end (not shown). In one embodiment, the coupling 300 is about 4.6 inches long and about 2 inches in diameter at a largest point but it is possible for the coupling to be any size suited for a particular application. The pipes and couplings are preferably made largely from polyethylene (PE). Virtually any type of PE including raised temperature (PE-RT) and high density PE as well as equivalent materials are acceptable.

The inner diameter of the coupling 300 has a transition area 306 to vary the size of the inner diameter 303. Adjacent the transition area 306, each end 302, 304 forms a shoulder 308, 310, respectively. When a pipe end is inserted into the coupling 300, the pipe ends are preferably inserted until contact is made with the respective shoulder 308, 310. The inner diameter 303 of each end 302, 304 also includes a susceptor ring 312. The susceptor ring 312 is composed mostly of iron or another like material that will generate a current flow and heat up due to natural resistance when placed in a magnetic field. In one embodiment, the susceptor rings 312 are a metal wire mesh insert and, in another version, an iron rich resin used in forming the coupling 300.

The outer diameter 305 of the coupling 300 is relatively reduced in the area surrounding the susceptor ring 312 to form an annular weld zone 311. The weld zone 311 has a width "W" approximately equal to the width "W" of the jaws 206, 207 of the wand 200. Thus, the jaws 206, 207 are mechanically aligned with the respective susceptor ring 312 for fusing. Additionally, the outer diameter 305 in the weld zone 311 is matched so that the jaws 206, 207 can be closed about the weld zone 311. However, the remainder of the outer diameter for each end 302, 304 is over-sized so that the jaws 206, 207 cannot be closed thereabout. Thus, a fusing operation cannot be attempted in the wrong location.

The inner diameter 303 of the coupling 300 also includes a retainer area portion 314 to aid in the manufacture of the coupling 300. Preferably, the inner diameter 303 is smooth, consistent and unobstructed by the susceptor rings 312 and the retainer area portion 314. In one embodiment, the retainer area portion 314 forms a thin sleeve 315 of PE that encloses the susceptor rings 312. As a result, the inner diameter 303 is a continuous wall of PE. It is envisioned that the entire coupling 300 except for the susceptor rings 312 are made from the same or similar materials such as a plastic resin that is heat fusible. Again, the retainer area portion 314 is preferably provided in a manner so that the inner diameter 303 is uniform and without flow obstruction except as required in the transition area and can be made so for any configuration of fitting.

Referring now to FIGS. 14A and 14B, an end view and a side cross-sectional view of a another coupling 400 in accordance with the subject disclosure are shown. As will be appreciated by those of ordinary skill in the pertinent art, the coupling 400 utilizes similar principles and structure to the coupling 400 described above. Accordingly, like reference numerals preceded by the numeral "4" instead of the numeral "3", are used to indicate like elements. The primary difference of the coupling 400 in comparison to the coupling 300 is one end being a threaded nipple for mechanically coupling to a fixture (not shown) rather fusing to a pipe.

Figure 14C:
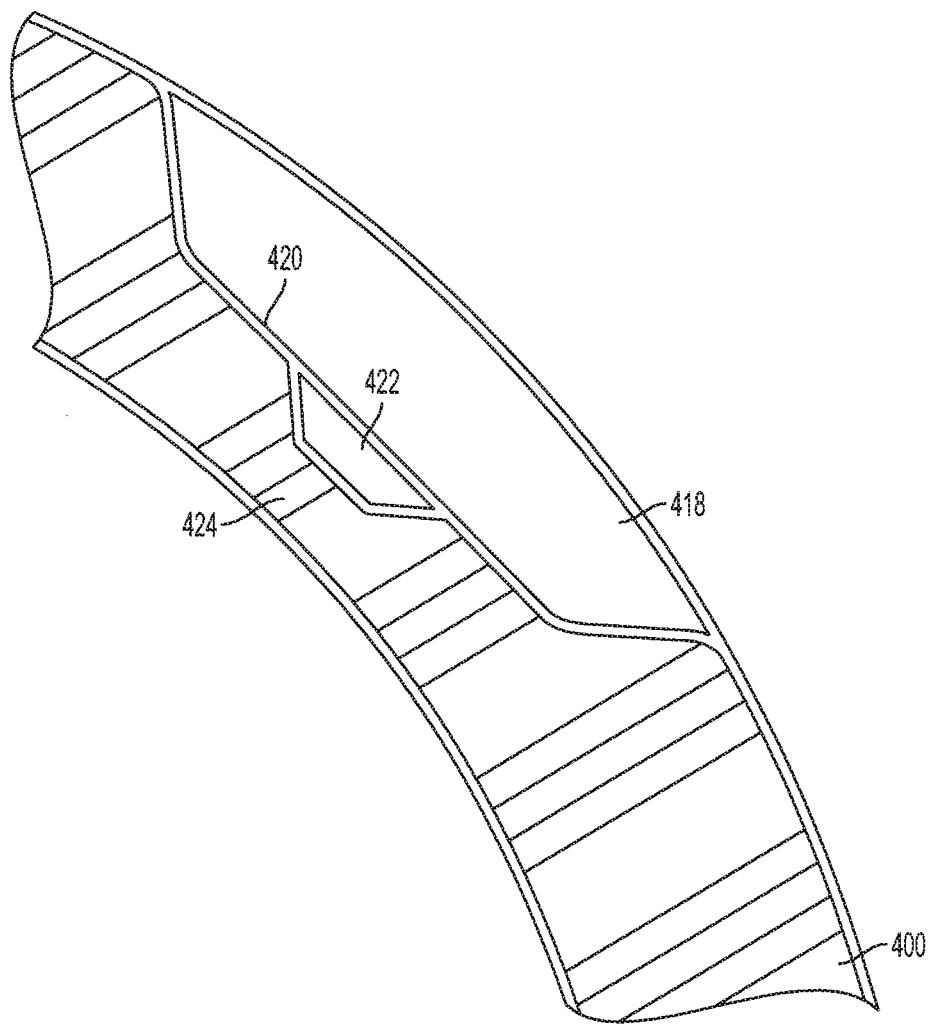
FIG. 14C is a partial cross-sectional view of the coupling of FIG. 14A taken through an indentation in the weld zone.

Referring now to FIGS. 14A and 14C, the coupling 400 includes an indentation 418 in the weld zone 410. The indentation 418 is configured so that upon completion of fusing, the indentation 410 will move outward to provide a visual and tactile indication of complete fusing. Preferably, a bottom 420 of the indentation 418 includes a further depression 422 that creates a relatively thin area 424 in the coupling 400.

As the indentation 418 is heated during fusing, the indentation 418 becomes soft or pliable. The fusing heats the coupling 400 from the susceptor ring 412 outward, creating a radial pressure or expansion that is sufficient to push out the depression 422 so that the depression 422 inverts when the fusing is complete. Thus, the depression 422 becomes a protrusion that is a visual and tactile indication of fusing. In another embodiment, the entire indentation 418 inverts during fusing.

It is envisioned that the indentations 418 are provided four times in each weld zone but more or fewer could be used. The indentations 418 are also suitable to be used on any coupling along with the rest of the subject technology. For example, without limitation, the coupling could additionally be a T-shape, an elbow shape, an end cap, a straight connector for joining equal size pipes in any number, combinations thereof and the like. In one embodiment, the susceptor ring is a dual concentric susceptor ring so that magnetic hysteresis occurs during fusing, which causes the rings to rub against each other and generate additional heat.

Fusing Operation

The kit 10 can be used to fuse pipe ends to couplings 300 in any setting because the control unit 100, wand 200 and couplings 300 are rugged and portable. Further, the fusing operation is easy to perform and relatively short. The kit 10 can be scaled to work with any size pipe and, for example, even for 10 inch diameter pipes, still performs quickly with moderate increases in energy requirements. Further, a single wand may also function with various size pipes.

Figure 15:
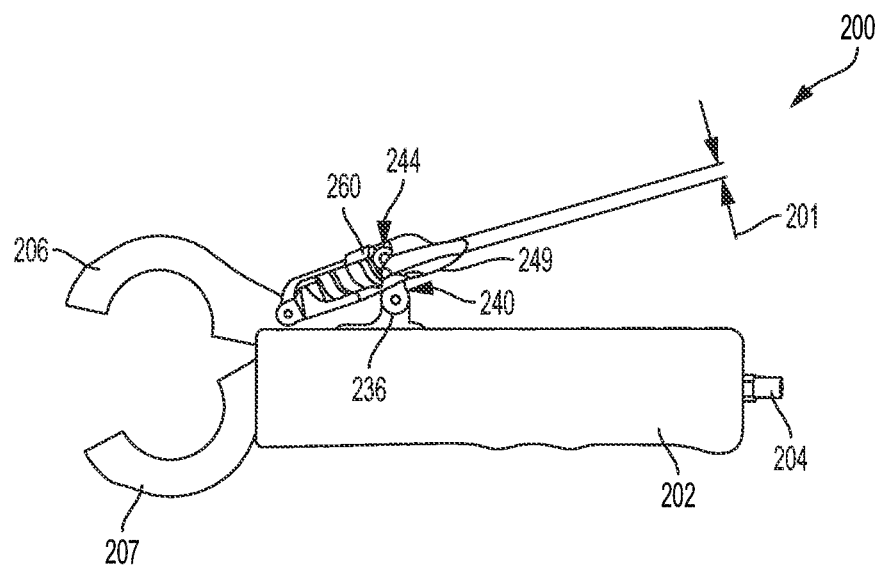
FIG. 15 is a side view of another wand in an open position in accordance with the subject disclosure.

Referring now to FIG. 15, a side view of another wand 200 in an open position in accordance with the subject disclosure is shown. The wand 200 of FIG. 15 is functionally the same and only cosmetically different from the wand 200 of FIGS. 7-12, thus renumbering was not used. At the start of the fusing operation, the technician would prepare the pipe end for fusing to a coupling (not shown) and ready the kit 10.

In this example, although not shown, the coupling 400 is as shown in FIGS. 14A and 14B. Such coupling 400 would typically be connected to a fluid network by the threaded end 404 prior to fusing to the pipe. The pipe end preferably has an even cut so that the pipe end can be inserted fully into the end 402 of the coupling 400 until the pipe end is flush with the shoulder 408. In other words, the technician simply inserts the pipe end into the coupling 400 as far as it will go and, in turn, the pipe is well positioned in the weld zone "W" and with respect to the susceptor ring 412 of the coupling.

The control unit 100 is readied by turning on the power using the switch 112, and selecting and attaching the wand 200 by the cable 122, wherein the wand 200 is sized to match the coupling 300. Next, the wand 200 is put in the open position shown in FIG. 15. The open position is a normal position as the spring 264 acts as a return spring to bias the jaw 206 away from the opposing jaw 207. The spring 264 biases by applying a force to the bushing 244 on the bracket 236 at an offset 201 to the third set pin 249, which creates a bias toward the open position. The pin 249 is biased away from the jaws 206, 207 in the intermediate slot 258.

Figure 14D:
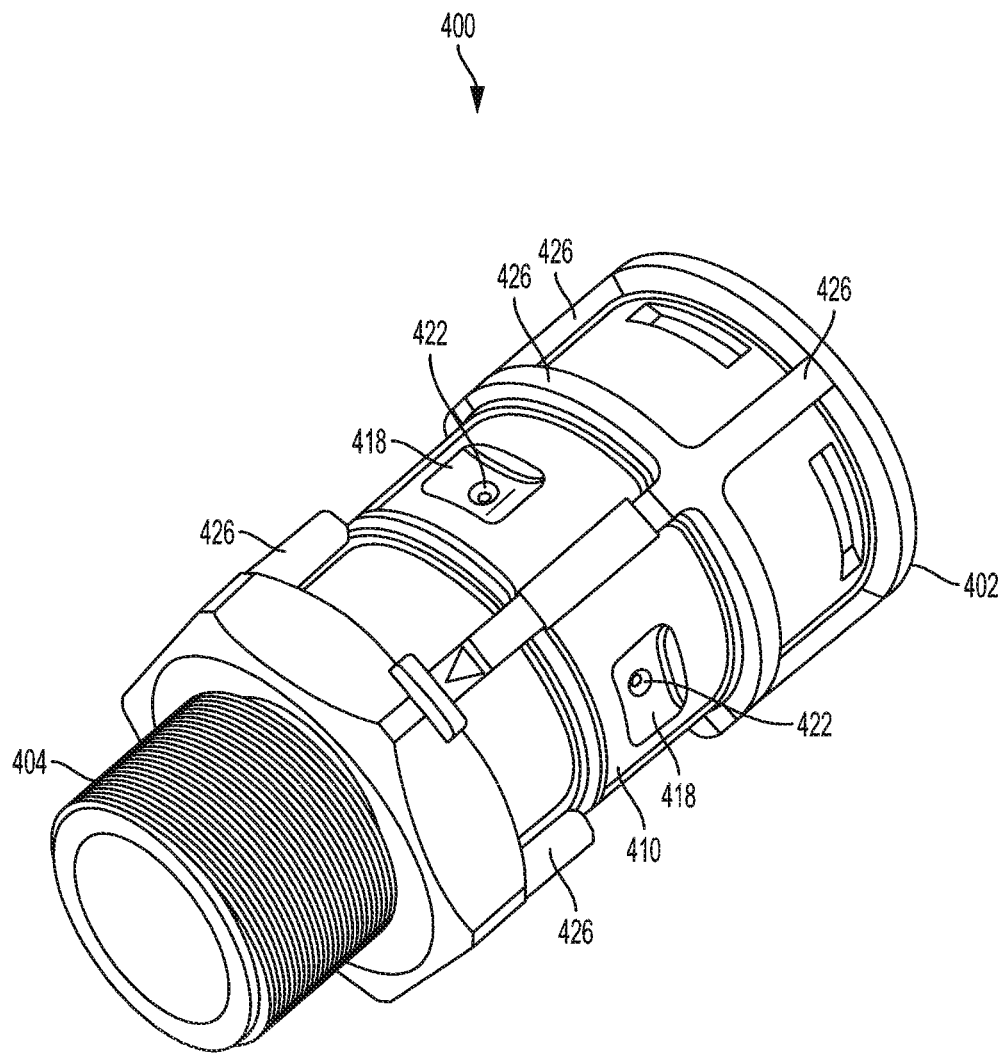
FIG. 14D is a perspective view of the coupling of FIG. 14A.

Next, with the jaws 206, 207 of the wand 200 open, the jaws 206, 207 are placed about the coupling in the weld zone "W." As noted above, when properly matched, the jaws 206, 207 will fit closely about the weld zone "W" when closed but not close about any other portion of the coupling 400 to prevent operator error in placement. As best seen in FIG. 14D, the perspective view, the coupling 400 is provided with ridges 426 that prevent closing the jaws of the wand anywhere but the weld zone "W" when using the proper size coupling for the respective wand.

Figure 16:
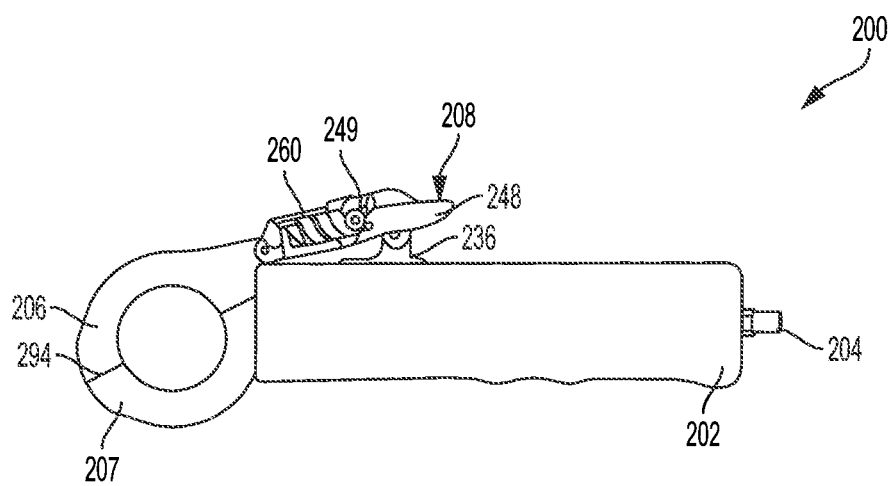
FIG. 16 is a side view of the wand of FIG. 15 in a set position.

Referring now to FIG. 16, a side view of the wand 200 in a set position is shown. The wand 200 is moved to the set position once the wand is about the weld zone "W", which can occur anytime before or after the pipe end is inserted in the coupling. To move the jaws 206, 207 to the set position, the technician applies a force to the trigger lever 248 so that the lever system 208 rotates towards the grip housing 202. The spring 264 applies a preload force to the pivot arm 240 with a vector component in line with the set pin to hold the lever system 208 in place against the end of the slot 258 in the trigger lever 248. As a result, the lever system 208 operates smoothly as if the third pin 249 is in a fixed location and the jaws 206, 207 are closed. When the jaw 206 moves into the closed position, the camming protrusion 278 pushes against the movable bar 280, which closes the horizontal switch 232.

Figure 17:
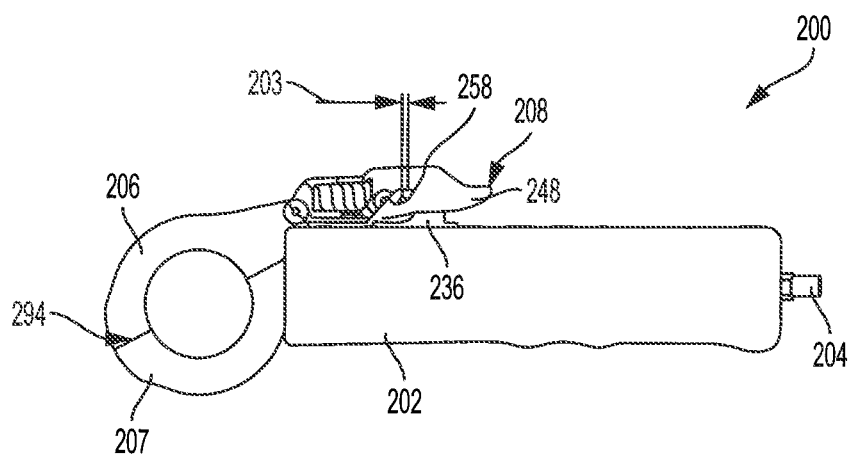
FIG. 17 is a side view of the wand of FIG. 15 in a compressed position.

Referring now to FIG. 17, another side view of the wand 200 in a further compressed position is shown. The wand 200 moves to the compressed position as the technician applies additional force to the trigger lever 248. The additional force transfers the preload force from the set pin 249 to the jaws 206, 207. The slot 258 allows the set pin 249 a linear degree of freedom or compliance gap 203 needed to avoid jamming prior to latching in the closed position.

Figure 18:
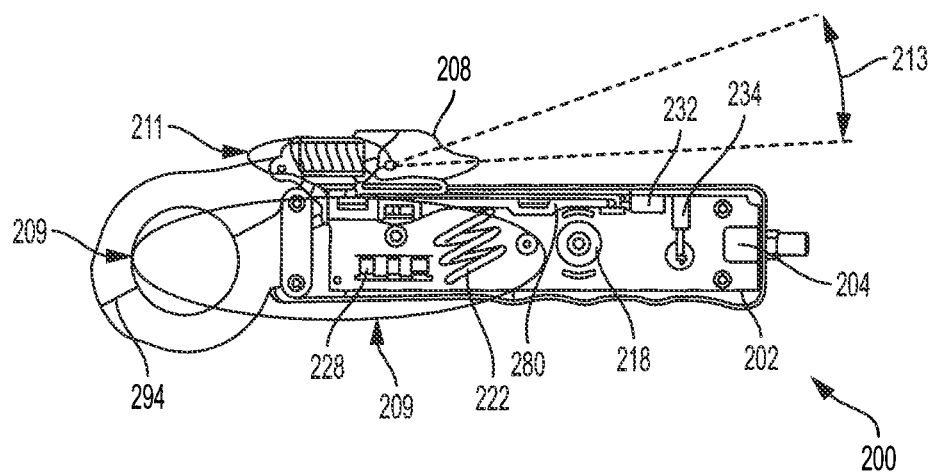
FIG. 18 is a side view of the wand of FIG. 15 in a latched closed position.

Referring now to FIG. 18, a side view of the wand 200 in a latched closed position is shown. In the latched closed position, the lever system 208 has rotated over center through an over center angle 213. The spring 264 provides both a preload force to the jaws 206, 207 for contact and a bias to the lever system 208 so the lever system 208 remains in the latched closed position when the technician removes the force against the trigger lever 248. Thus, the technicians hands are free to perform additional tasks. Once the fusing operation starts, the wand 200 may also sense the electromagnetic load of the susceptor ring within the jaws 206, 207. If all is in order, the ready indicator 116a is lit. If not, the error indicator 116c is lit and the LCD screen 110 will report a reflection error and the fusing operation will stop.

To start the fusing operation when ready, the technician depresses the actuation button 210 and an RF signal area or fuse zone 209 is created. Preferably, the fuse zone is a 13.56 MHz magnetic field about the susceptor ring of the coupling. A high frequency current develops in the susceptor ring through electromagnetic induction action. The current flows within and around the susceptor ring generating heat through the susceptor ring's natural resistance. This heat is sufficient to melt, for example, even high density PE or PE-RT of the pipe and coupling creating a strong permanent hermetic seal therebetween. Typically, the pipe and coupling remain cool enough for the technician to handle them immediately.

During fusing, the fusing indicator lamp 116*b* will flash and the LCD screen 110 will provide a countdown to completion. In one embodiment, the fusing operation takes approximately 40 seconds for a ¾ inch pipe and uses about as much energy as a 100-150 Watt light bulb. After fusing is complete, to release the jaws 206, 207, the trigger lever 248 is pushed or popped upward, such as by the technician's thumb, and the spring 264 provides the bias force to open the jaws 206, 207 without further action.

In one embodiment, the control unit 200 includes an ambient temperature sensor and automatically adjusts fusing times based on the ambient temperature. The control unit 200 may also recognize the size of the wand and, thereby, the pipe to adjust the fusing time accordingly. In still another embodiment, the wand 200 is provided with a calibration button so that, upon depression of the calibration button, the wand and the control unit communicate to determine the size of the wand and preferably the coupling to fine tune the fusing time. The coupling size may also be entered into the control unit manually. In another embodiment, the kit 10 determines ambient temperature and/or temperature of the components such as the coupling and/or the wand, in order to properly adjust the fusing operation. Other parameters such as the coupling size and the like may be input by using the info button 117 and LCD screen 110. Still other wands of varying size may be hard wired to provide size parameters to the control unit 100.

Still referring to FIG. 18, the RF signal area or fuse zone 209 has an oblong shape. Advantageously, the spring 264 is located outside of the fuse zone 209 in an upper region 211, which prevents interference and allows the wand 200 to function efficiently.

As can be seen, the subject technology provides a valuable kit that creates effective seals between pipes and couplings in a fast, easy and effective manner. The subject technology is also safe in that exposure to open flames, VOC based adhesives or high voltage electricity are not required.

INCORPORATION BY REFERENCE

All patents, published patent applications and other references disclosed herein are hereby expressly incorporated in their entireties by reference.

While the invention has been described with respect to preferred embodiments, those skilled in the art will readily appreciate that various changes and/or modifications can be made to the invention without departing from the spirit or scope of the invention. For example, each claim may depend from any or all claims, even in a multiple dependent manner, even though such has not been originally claimed.

What is claimed is:

1. A kit for fusing thermoplastic piping comprising:
   a plurality of couplings, each coupling having a susceptor layer concentric with a weld zone, the weld zone having a reduced outer diameter relative to a remainder of the respective coupling;
   a control unit for providing a current at high frequency; and
   a wand connected to the control unit, the wand including:
   a handle for gripping by a user, the handle having a proximal end connected to the control unit and a distal end;
   opposing jaws mounted on the distal end, each jaw including an arcuate conductor such that the arcuate conductors form a circular inner diameter when the jaws make contact to create a magnetic field when the current passes through the arcuate conductor;
   a lever system coupled to the distal end for opening and closing the jaws, the lever system including a spring for selectively biasing the lever system in a latched position with jaws closed and an open position with the jaws open
   wherein:
   each coupling is sized such that the jaws will only close about the weld zone to insure proper positioning of the magnetic field with respect to the susceptor layer;
   the magnetic field of the arcuate conductors heats the susceptor layer to create a fuse zone about the susceptor layer; and
   the spring is outside the fuse zone.

2. A kit as recited in claim 1, wherein the wand senses an electromagnetic load of the susceptor layer within the jaws.

3. A kit as recited in claim 1, wherein a first axial width and the reduced outer diameter of the weld zone matches a second axial width and inner diameter of the jaws so that a position of the fuse zone about the weld zone therein is substantially determined when the jaws close thereabout.

4. A kit as recited in claim 1, wherein each coupling forms an inner shoulder spaced apart from the weld zone so that when a pipe end is inserted into the coupling until contact is made with the respective shoulder by the pipe, the pipe is positioned correctly with respect to the weld zone for fusing.

5. A kit as recited in claim 1, wherein each coupling includes a retainer area portion having a thin sleeve that encloses at least one susceptor ring.

6. A kit as recited in claim 5, wherein each susceptor ring is a dual concentric susceptor ring.

7. A kit as recited in claim 1, wherein each coupling forms at least one indentation in the weld zone so that upon completion of fusing, the indentation moves outward to provide a visual and tactile indication of complete fusing.

8. A kit as recited in claim 7, wherein the indentation includes a secondary radially inward central depression.

9. A kit as recited in claim 1, wherein the spring holds the jaws closed in the latched position so that hands of a user are free.

10. A kit as recited in claim 1, wherein the susceptor layer includes at least one susceptor ring fabricated from a material that generates current flow and heat due to a natural resistance when placed in a magnetic field.

11. A kit as recited in claim 10, wherein the at least one susceptor ring is fabricated from a material selected from the group consisting of: an iron rich resin; iron; and combinations thereof.

12. A kit as recited in claim 1, wherein the susceptor layer includes a susceptor ring fabricated from metal wire mesh.

13. A kit for fusing thermoplastic piping comprising:
   a coupling having a susceptor concentric with a weld zone;
   a control unit for providing a current at high frequency; and
   a wand connected to the control unit, the wand including:
   a handle for gripping by a user, the handle having a proximal end connected to the control unit and a distal end;
   opposing jaws mounted on the distal end, each jaw including an arcuate conductor such that the arcuate conductors form a circular inner diameter when the jaws make contact;
   a lever system coupled to the distal end for opening and closing the jaws, wherein: the coupling is sized such that the jaws will only close about the weld zone; and when the jaws close about the weld zone and the current passes through the acruate connectors, the arcuate conductors create a fuse zone about the susceptor, wherein the coupling has an inner diameter that forms a shoulder so that when a second coupling is inserted therein until the second coupling makes contact with the respective shoulder, the second coupling is positioned correctly with respect to the weld zone for fusing.

14. A kit as recited in claim 13, wherein the coupling forms at least one depression in the weld zone so that upon completion of fusing, the depression moves outward to provide a visual and tactile indication of complete fusing.

15. A kit as recited in claim 14, wherein the at least one depression is formed within an indentation.

16. A kit as recited in claim 14, wherein the at least one depression is four depressions.

17. A kit as recited in claim 13, wherein the lever system holds the jaws closed in a latched position so that hands of the user are free.

18. A kit as recited in claim 13, wherein the susceptor includes at least one susceptor ring fabricated from a material that generates current flow and heat due to a natural resistance when placed in a magnetic field.

19. A kit as recited in claim 18, wherein the at least one susceptor ring is fabricated from a material selected from the group consisting of: an iron rich resin; iron; and combinations thereof.

20. A kit as recited in claim 13, wherein the susceptor includes a susceptor ring fabricated from metal wire mesh.

21. A method for fusing thermoplastic piping comprising the steps of:
selecting a coupling from the group consisting of T couplings, elbows, end caps, and straights, each coupling having a susceptor concentric with a weld zone;
providing a control unit for providing a current at high frequency, the control unit having: a wand having opposing jaws mounted on a distal end, each jaw including an arcuate conductor such that the arcuate conductors form a circular inner diameter when the jaws make contact; and a system coupled to the distal end for opening and closing the jaws;
inserting a pipe end into the selected coupling;
closing the jaws about the weld zone using the system; and
passing the current passes through the arcuate conductors until the coupling and the pipe are fused together,
wherein the coupling has an inner diameter that forms a shoulder and further comprising the step of inserting the pipe into the coupling until the pipe makes contact with the shoulder for aligning the susceptor with the jaws.

22. A method as recited in claim 21, wherein the coupling is sized such that the jaws will only close about the weld zone.

23. A method as recited in claim 21, further comprising the steps of forming at least one depression in the weld zone so that upon fusing, the depression moves radially outward to provide a visual and tactile indication of complete fusing.

24. A method as recited in claim 21, wherein the at least one depression is four depressions.

25. A method as recited in claim 21, further comprising a lever system that selectively holds the jaws closed in a latched position so that hands of a user are free.

26. A method as recited in claim 21, wherein the susceptor includes at least one susceptor ring fabricated from a material that generates current flow and heat due to a natural resistance when placed in a magnetic field.

27. A method as recited in claim 26, wherein the at least one susceptor ring is fabricated from a material selected from the group consisting of: an iron rich resin; iron; and combinations thereof.

28. A method as recited in claim 21, wherein the susceptor includes a susceptor ring fabricated from metal wire mesh.

* * * * *